(12) United States Patent
Heinrich et al.

(10) Patent No.: US 11,334,050 B2
(45) Date of Patent: May 17, 2022

(54) AUTHENTICATION SYSTEM AND AUTHENTICATION METHOD FOR EXECUTING A WORK PROCESS ON AN OBJECT

(71) Applicant: Francotyp-Postalia GmbH, Berlin (DE)

(72) Inventors: Clemens Heinrich, Oranienburg (DE); Dirk Rosenau, Berlin (DE); Stephan Gunther, Glienicke (DE); Uwe Hubler, Neuenhagen (DE)

(73) Assignee: FRANCOTYP-POSTALIA GMBH, Berlin (DE)

( * ) Notice: Subject to any disclaimer, the term of this patent is extended or adjusted under 35 U.S.C. 154(b) by 292 days.

(21) Appl. No.: 16/716,682

(22) Filed: Dec. 17, 2019

(65) Prior Publication Data
US 2020/0218230 A1    Jul. 9, 2020

(30) Foreign Application Priority Data
Dec. 19, 2018    (DE) .......................... 102018132993.8

(51) Int. Cl.
*G05B 19/4065* (2006.01)
*G05B 19/04* (2006.01)
*G06F 21/50* (2013.01)

(52) U.S. Cl.
CPC ..... *G05B 19/4065* (2013.01); *G05B 19/0415* (2013.01); *G06F 21/50* (2013.01); *G05B 2219/50185* (2013.01); *G05B 2219/50193* (2013.01); *G06F 2221/2101* (2013.01)

(58) Field of Classification Search
CPC ............. G06F 21/50; G06F 2221/2101; G05B 19/0415; G05B 19/4065; G05B 2219/21081; G05B 2219/50185; G05B 2219/50193
See application file for complete search history.

(56) References Cited

U.S. PATENT DOCUMENTS

| 2004/0255185 | A1* | 12/2004 | Fujiyama | G06F 11/1641 714/4.1 |
| 2008/0312877 | A1 | 12/2008 | Keese et al. | |
| 2009/0059857 | A1* | 3/2009 | Kim | H04W 28/08 370/329 |
| 2011/0004885 | A1* | 1/2011 | Kikuchi | H04L 41/5096 718/104 |
| 2013/0268674 | A1* | 10/2013 | Bailey | G06F 9/5027 709/226 |
| 2015/0128216 | A1* | 5/2015 | Rolls, IV | H04W 84/105 726/3 |
| 2019/0101882 | A1* | 4/2019 | Strinden | G05B 19/0426 |

FOREIGN PATENT DOCUMENTS

| EP | 2237123 A1 | 10/2010 |
| WO | 2006013021 A2 | 2/2006 |
| WO | 2016065493 A1 | 5/2016 |

* cited by examiner

*Primary Examiner* — Tuan C Dao
(74) *Attorney, Agent, or Firm* — Blue Filament Law PLLC

(57) ABSTRACT

A system and a method for executing a work process on an object. The system includes at least one work station, an acquisition device, a control device and an auditor device.

15 Claims, 2 Drawing Sheets

AUTHENTICATION SYSTEM AND AUTHENTICATION METHOD FOR EXECUTING A WORK PROCESS ON AN OBJECT

FIELD OF THE INVENTION

The invention relates to a system and a method for executing a work process on an object, the system comprising at least one work station, an acquisition device, a control device and an auditor device. The system and procedure can be used to authenticate process steps or system configurations.

Background of the Invention

There is a technical need to regularly monitor the configuration of technical equipment that forms a network or a system, for example, and to verify whether the correct equipment components are used within the equipment or whether the equipment components are in an operational state. The present invention should preferably enable such a status check not only for physical components within the devices, but also, for example, for software applications or deposited data, such as stored account balances or credit amounts within a technical device. For example, every year the economy suffers high losses due to defective malware that causes damage to computers or IT infrastructure. It would be desirable if such monitoring could be carried out at a central point of the network or system. This can be particularly helpful, for example, if the individual technical devices are located far away from each other or from the central location, as often the case in a global economy. There is also a technical need to verify the authenticity of a device or system component, especially without the need for a suitably trained service technician to examine the device on site.

It is therefore an objective of the present invention to provide a system and a method for executing a work process on an object or for monitoring such a process execution. Preferably, the aim is not simply to enable external monitoring of the technical devices, but to provide particularly secure monitoring of processes within a system or device. In particular, it would be desirable if information transmitted within a system or device, or transactions or process steps could be secured.

SUMMARY OF THE INVENTION

The objective is solved by the features of independent claims. Advantageous features of the invention are recited in the dependent claims. According to the invention, a system is provided for executing a work process on an object, wherein the work process comprises at least one process step and wherein at least one state of the object is changed at least temporarily by the work process, wherein the system comprises at least the following components:

a work station for executing the at least one process step of the work pro-cess, an acquisition device for acquiring at least one piece of acquisition information and/or a status parameter of the work station and/or the object, each work station being assigned an acquisition device, a control device for controlling the work station when executing a process step of the work process, and an auditor device.

DETAILED DESCRIPTION OF THE INVENTION

Figure 1:
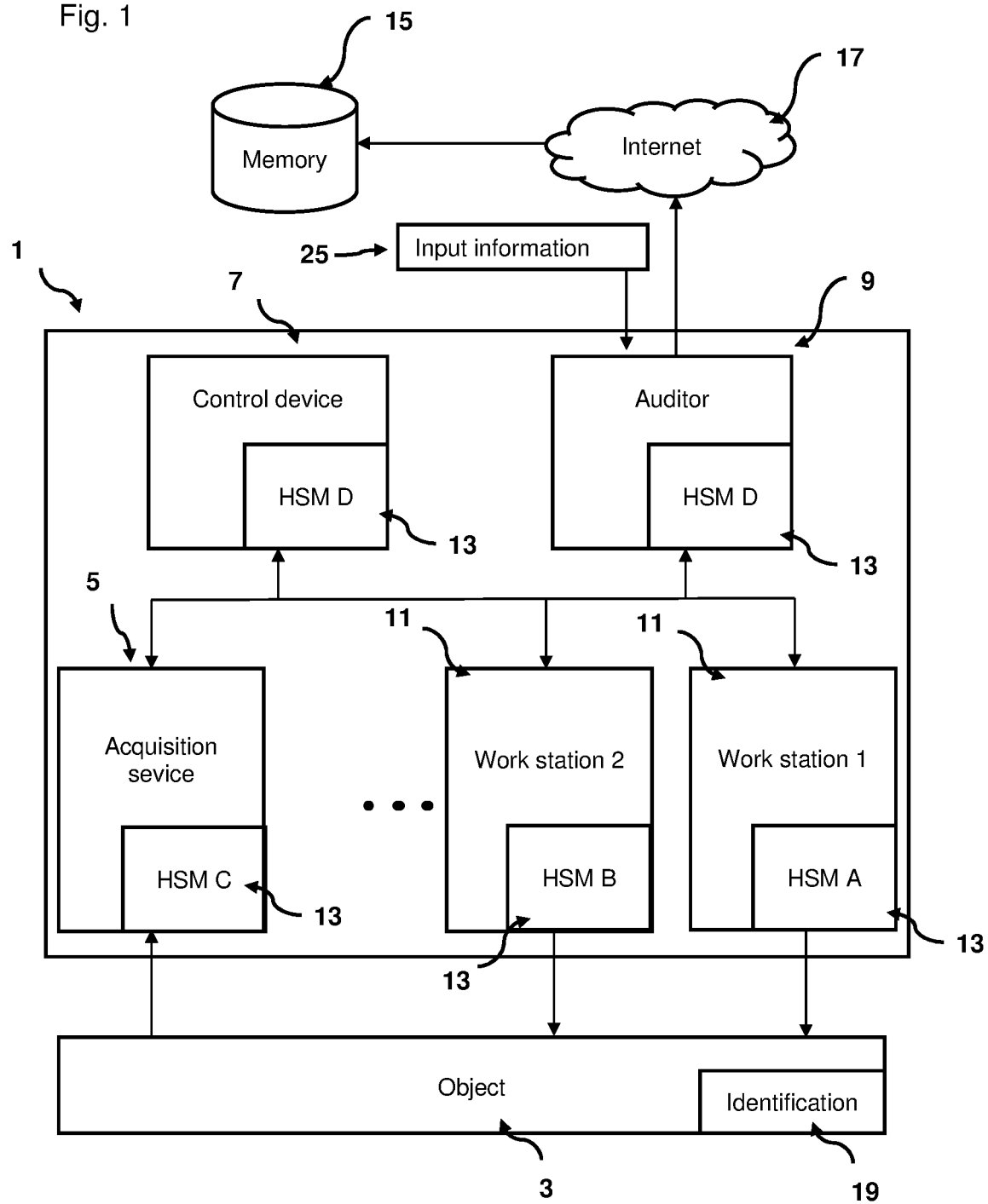
FIG. 1 illustrates a flow chart of a system embodiment of the present invention.

The system is characterized in that at a time point prior to starting the work process, the control device interrogates configuration information of the acquisition device, and the auditor device receives and verifies the configuration information and creates auditing information depending on a result of the verification of the configuration information and sends the auditing information to the control device, and the control device processes the auditing information and depending on the auditing information starts the work process or not.

An significant concept underlying the invention is that an auditor device monitors when a system controller interrogates the individual components of the system, for example with regard to whether a system component is present and/or ready for use or whether a "correct" system component is installed which is particularly suitable for performing the desired function in the execution of a work process. In the sense of the invention, the auditor device can preferably also be called an auditor, whereby the terms are used synonymously. The monitoring of the auditor may also be considered, in the sense of the invention, as "listening" or "taking notes" of the interrogation by the system control, the function of the system controller being assumed in particular by a control device within the proposed system. The system controller is preferably also referred to as a control device in the sense of the invention.

It is particularly preferred in the sense of the invention that the auditor device is carried out by a safety device of a system component. Preferably, the auditor device or safety device may be part of the work station used to execute a work procedure or process on an object. The security device preferably comprises a Hardware Security Module (HSM) or is formed by one. The HSM may preferably also be part of the work station or another component of the proposed system. In the sense of the invention, it is particularly preferred that the auditor device is a safety device of the work station.

It is preferred in the sense of the invention that the HSM is a hardware-based cryptographic module, preferably with FIPS 140-2 certification. It is preferred in the sense of the invention that the statement that a device operates safely technically means that the corresponding device has such FIPS certification. The provision of the FIPS-certified auditor device solves in particular a technical problem with technical means, namely the provision of a particularly secure data transmission within an authorization system and authorization method.

The HSM may be formed by or include a single chip module, an autonomous multi-chip module or an embedded multi-chip module. The HSM is preferably adapted to store data particularly securely. In particular, an HSM is capable of generating, storing, using and/or maintaining critical security parameters such as passwords, confidential data or keys for encrypting data. For example, the keys can be symmetrical or asymmetrical. Advantageously, HSM can be used as cryptographic coprocessors. In preferred embodiments, an HSM can have a battery-powered circuit and/or voltage monitoring. This enables in particular the integration or provision of a real-time clock for correct time recording and time stamping, which can, for example, ensure that expired keys may no longer be used. In addition, an HSM may include redundant storage, which may be used, for example, to employ several technologies simultaneously for generating additional data security.

According to the invention an HSM comprises a chain of certificates which are preferably loaded onto the device before the HSM is put into operation. The HSM is also adapted to generate its own private and public device keys. Preferably, the private key does not leave the HSM at any time while the public key can be handed over to the outside, for example to an external server for signing. In return, the HSM can receive a personalized, signed device certificate, with which the HSM can significantly increase security in an Internet of Things system (IoT). The HSM can then be recognized and authenticated by the external server as a "real" security device, which is made possible in particular by assigning a unique identifier. In this way, authenticated TLS (Transport Layer Security) connections can be established with particular ease. It is preferred to use a public key infrastructure.

It is preferred in the sense of the invention that the auditor device and the other components of the system, in particular the work station, the acquisition device and the control device, are assigned an ID or ID value, respectively. The corresponding IDs or ID values can be stored individually in each system component. However, it may also be preferable for the IDs or ID values of the system components to be stored centrally at a single location in the system, for example in the control device. The interrogation of the system performed by the control device then consists, for example, of the control device verifying whether a system component is present and ready for use, or whether a "correct" system component is installed that can perform the desired function in executing a work process without causing erroneous results or damage. In particular, the control system asks the auditor during the verification or "listening in" to the audit whether the determined, i.e. ascertained system configuration corresponds to the specifications.

This is preferably done by comparing the detected IDs or ID values of the system components with those IDs or ID values that are stored in the system, for example in the control device. It may be preferred in the sense of the invention that exactly one "correct" ID is stored in the system for each system component. However, it may also be preferable that several different types of the component can be used or employed for one system component. In this case, several different possible IDs or ID values can be stored in the system for this system component.

It may be preferred in terms of the invention that the IDs or ID values are composed of different sub-IDs or sub-ID values. This may in particular be the case if the system component itself consists of different technical parts, such as a franking machine, which may, for example, form a work station in the sense of the invention.

However, it may also be preferred in the sense of the invention that each component of the work station is assigned its own ID or ID value and that, when querying the system components, the components of one system component are considered or treated as separate system components. The method step of the proposed auditing method described herein is preferably referred to as interrogation of configuration information of an acquisition device by a control device at a time point before a start of the work process, the acquisition device being assigned to the work station and being adapted to acquire at least one acquisition information and/or one status parameter of the work station and/or the object.

It is particularly preferred in the sense of the invention that the configuration information is an ID and/or an acquisition information and/or a status information of the acquisition device. Status information and status parameters are preferably used synonymously. The term "acquisition information and/or the status information of the acquisition device" is to be understood in the sense of the invention in such a way that it refers both to an operating parameter determined by the acquisition device, the term "operating parameter" referring in particular to the status of a system component, for example, a work station, as well as a status parameter determined by the acquisition device, the term "status parameter" being used to describe in particular external conditions affecting the system, such as a status of the object whose status is to be changed by the work process. For this reason, the term acquisition information is preferably used, which covers both operating parameters and status parameters.

If the auditor determines that the ID of each system component or part of the system matches a stored ID, the auditor gives his agreement to execute the work process and the work process can be started. This agreement is based on processing of the auditing information by the control device, which preferably results in the work process being started depending on the auditing information, i.e. when the determined and the stored IDs match.

If the IDs of a system component or part of the system do not match a stored ID, the work process is not started. Instead, a signal may be generated, sent and/or delivered, for example, in the form of an SMS message sent to an operator of the work station or to his mobile communication device, or by an e-mail notification, which is sent to a deposited e-mail address, or by an acoustic signal or by an error message displayed on a display device or a dashboard. The operator is thus advantageously enabled to change the system components in such a way that a renewed query of the system components by the control device, wherein the auditor "listens in", leads to a positive result and to starting the work process. This can be achieved, for example, by replacing a system component identified as "incorrect" or "not ready for use" or by converting it to an operational state.

It is preferred in the sense of the invention that the auditor's consent to start the work process is signed, i.e. that the corresponding release is signed. In the sense of the invention, this preferably means that a preferably digital signature is assigned to the release. In this process, a signature key is assigned to the auditor's release, which is preferably calculated by the auditor and which is required so that the recipient of the release message, in this case preferably the control device, can receive, decrypt and implement the release. It is preferred in this context that the auditor device sends the auditing information to the control device and that the auditing information is processed by the control facility.

In the sense of the invention, it is particularly preferred that the auditor device is adapted to secure the auditing information with cryptographic means, e.g. by using a public key infrastructure. This may be implemented, for example, by preferably digitally signing the auditing information. Preferably, the auditor device has cryptographic capabilities that are used in the generation of the digital signature to achieve or enhance encryption of the information transmitted. Preferably, the auditing equipment shall include cryptographic means, such as a processor with high computing power, which can be used to transmit and/or sign information, messages and/or transactions in the proposed system in encrypted form.

It is preferred in the sense of the invention that the acquisition device comprises at least one sensor or sensor system. The sensors of the acquisition device are preferably adapted to collect configuration information that is later forwarded to the auditor device. The configuration information shall preferably include operational and/or status parameters of the system or a work station interacting with the corresponding acquisition device. It is preferred in the sense of the invention that the status parameters describe the parameters which externally affect the system or work station. For example, this could be a temperature in a room where the work station is located. However, the status parameter can also relate without limitation to humidity, ambient pressure, time of day, brightness, etc.

It may be preferred in the sense of the invention that the acquisition device functions in particular as a safety device and that the proposed system preferably comprises several safety devices which can communicate with each other or among themselves. It is particularly preferred that the safety devices of the work stations form a communication network with each other, in which information can be exchanged. It is particularly preferred that the exchange of information and communication in the communication network, which is preferably part of the proposed system, is secure, i.e. that it meets the security requirements of the FIPS standard. It is particularly preferred in the sense of the invention that the system components communicate with each other in such a way that one component of the proposed system, for example the acquisition device, detects a system configuration, whereby the same or another system component can derive on the basis of this configuration information which actions are possible with the proposed system based on the detected configuration. This shall be described in the following application example:

For example, the proposed system may be part of a security document production system. Security documents can be identity cards, passports or driving licences, for example. A process for the production of such a security document may include different work stations which execute different tasks in the production process. In particular, different work stations may be provided to introduce different security features in the security document to be produced.

For example, laser sources, printing units, punching and/or perforating units may be provided which are capable, for example, of lasering, printing, punching or perforating security features into the security document. In addition, a work station may be provided in which a user may insert blanks from which the security documents are later to be produced. The blanks can be paper, cardboard or plastic-based substrates, for example, which are available as blanks neither individualized nor serialized. It may be preferable, for example, to have different blank types for the ID documents of different countries, which can be inserted into the insertion station and processed into finished ID documents with the production system. Preferably, the various work stations, such as the laser source, printing unit, punching unit, perforating unit and/or insertion station, include acquisition devices that can determine the status of each work station.

It is preferred in the sense of the invention that the parameters determined within the proposed system, which describe the current states within the system or the current states of the work stations, are referred to as operating parameters. An operating parameter can be, for example, what type of blanks are inserted into the insertion station (thick or thin blanks, paper or plastic substrate, sufficient quantity or almost used up). In the case of a printing unit, the appropriate acquisition device can determine, for example, whether there is sufficient ink in the printer and whether the printer is warmed up and operational or cold and not operational. A work station may also be, for example, a data processing system with a storage medium and/or with a database, whereby the relevant information required to produce the desired security document (for example: "Italian passport on a type A paper blank with security features A, B and C") may be stored in this data processing system, the storage medium and/or the database.

It is preferred in the sense of the invention that the proposed system recognizes which work stations are currently operational and are capable of performing the functions assigned to them. If, for example, 100 Italian passports with the above-mentioned features are to be produced, the proposed system can verify whether the relevant information is stored in the system and whether the relevant prerequisites for production are met. In the above example, this would be the case, in particular, if the system contained at least 100 type A paper blanks and the corresponding work stations had the appropriate consumables to apply the security features A, B and C to the passports. In addition, all required work stations would need to have notified the system, in particular the auditor device, that they are operational. If all these conditions are met, the production of the 100 Italian passports may start. This can preferably be done by having the auditor device determining the actual state of the system or the work stations based on the information provided by the acquisition devices and compare them with the requirements for the production of Italian passports, preferably stored in the system. If all the conditions are met, the auditor device can use a control device to arrange for the production of the 100 Italian passports. The information transmitted by the acquisition device regarding the actual state of the system comprises preferably the operational parameters of the work stations or the status parameters of the object to be processed or produced by the work process, in this case the Italian passport, or the configuration information transmitted by the acquisition device to the auditor of the proposed system.

In other words, in the sense of the invention, it is preferred that the components of the proposed system can verify themselves against each other and that the auditor device in conjunction with the control device of the system can determine which processes are currently feasible and which are not. Mutual verification can, for example, consist of checking whether a work station is ready for operation or whether it has enough consumables available to execute a certain process step.

It can also be checked whether the corresponding work station is "the correct work station" in the sense that it has the necessary authentication to execute the desired process step. For example, the security document production system may include work stations that are essentially capable of executing the same process step, but at different security levels, which may be expressed, for example, by different security certifications. For example, if a security document is to be produced for which an execution with a work station with a very high security level is necessary, the proposed system can, in particular through the auditor device and the data available to said auditor device, allow a work station with a higher security certification to execute the process step and exclude another work station with a too low security level from executing the process step. When it comes to the production of goods or products, the proposed system preferably allows the system to control its own operation automatically, depending on both the status parameters externally acting on the system and the operating parameters internally present within the system. The particular advantage of the proposed system is that the relevant data is exchanged between the system components "securely" in the sense of the invention, for example using FIPS certified security devices or system components or work stations. This ensures that the transmitted data cannot be externally manipulated, especially in safety-relevant applications such as the production of security documents. The secure, i.e. FIPS certified, transmission of data within the system is a particular advantage of the present invention.

In the sense of the invention, it is particularly preferred that the interaction of the system components in the context of the proposed invention is intelligent, i.e. smart. The terms "intelligent" and "smart" are used synonymously in the sense of the invention and are preferably understood in the sense of the invention as follows:

In conventional control systems, which are known from the state of the art, the system is often controlled or regulated by means of fixed limits or threshold values. For example, in a building ventilation system, an air conditioning system may be designed to start operating at temperatures above 20° C. In another example, an indicator in an engine or its oil system may indicate that a soot filter needs to be replaced because a certain level of contamination of the oil or filter is exceeded. In a system which is referred to as "intelligent" or "smart" in the sense of the invention, the system controller, when controlling the system or its work stations is not or not only determined by fixed or predetermined limits or thresholds, but the corresponding auditor device of the proposed smart system is preferably capable of taking into account interactions between the status parameters preferably externally acting on the system and the operating parameters prevailing within the system. For example, if the system's acquisitions devices detect that the work station environment is at a low temperature, the auditor device is preferably adapted to detect that the low ambient temperature has an effect on the viscosity of the engine oil, so that different limits for the degree of contamination of the engine oil may apply than at high temperatures, where the engine oil is typically less viscous.

If the proposed system is used in a building ventilation and air conditioning system, for example, correlations between temperature, solar radiation, air pressure and/or humidity as status parameters on the one hand and the degree of contamination of a filter device or the amount of liquid in a room humidifier as operating parameters on the other hand can be put into relation to each other. This will preferably enable the proposed system to be able to control the system with which it interacts as a function of external status parameters, the external status parameters preferably interacting with the operating parameters of the system or work stations, similar to communicating tubes.

Possible relations and dependencies between the preferred system-internal operating parameters and the status parameters can, for example, be stored in the auditor device of the system or in a storage medium within the system and/or a database, whereby the database can, for example, be a local component of the system or whereby remote access to an external database can be possible. It is preferred in the sense of the invention that a system in which interactions or relations between operating and status parameters can be taken into account in controlling the system is referred to as intelligent or smart.

It is preferred in the sense of the invention that the proposed authentication system or authentication method can interact with other IoT systems or IoT methods, such as payment and/or logging systems or procedures. This advantageously further increases the many possible uses of the invention.

It is preferred in the sense of the invention that the proposed system is adapted to execute a work process on an object, wherein the work process comprises at least one process step and wherein the work process at least partially changes at least one state of the object. The object can preferably be a physical or a non-physical object. Preferably, a work station is used to execute the work process, which can be a franking machine, for example. In this case, the object can be a physical object, for example an envelope printed with a franking code. In the sense of the invention, the printing of the franking code represents a change in the state of the object, because the envelope is transferred from a first state to a second state by printing. In the first state, the envelope is preferably unprinted and thus unfranked, while in the second state, the envelope is printed and thus franked.

For example, the object can also be a numerical value or a parameter set that describes the state of an object or a process. A change of this numerical value or of this parameter set can then be a change of an object state in the sense of the invention. If a numerical value or each individual parameter in a parameter set changes, this is preferably referred to as a complete change of the state of the object in the sense of the invention. If only one parameter or a subset of the parameters of the parameter set changes, this is preferably referred to as a partial change of the object state.

It is intended in the context of the present invention that the work process changes at least one state of the object at least temporarily. In the sense of the invention, this preferably means that a change in the state of an object lasts at least for a certain period of time, i.e. for a period of time with a certain duration, whereby the change of state can be permanent or whereby the change of state can be terminated after a certain time has elapsed. In the latter case, it is preferable to speak of a temporary change of state. In this case, the object can, for example, return to its initial state, which is called the first state in the sense of the invention. However, it may also be preferred that the object is transferred to a third state, which is different from the initial and intermediate state, which is preferably called the second state.

With the proposed system and the proposed method, it is advantageously possible to monitor the status of system components, such as work stations or objects. This done especially on a particularly high security level, which is preferably guaranteed by the provision of the auditor device, which can be designed as a Hardware Security Module (HSM) for example. The provision of the possibility of monitoring the status of component or object is particularly advantageous because a change in business models can be observed in the economy and industry. For example, when renting out air compressors, it is no longer the service life or the operating time of the compressor that is used as a calculation factor to determine a rental fee, but often the quantity of compressed air actually delivered by the compressor. With the proposed system and procedure, the quantity of this compressed air can be recorded, forwarded, processed and invoiced particularly easily as a change of the state of the object. The required parameters can preferably be available both as status parameters (e.g.: consumed air volume) and as operating parameters (e.g.: movements of an air pump) and can include in particular redundant information to avoid errors.

In addition, the proposed system and the proposed method enable individualized devices, components and/or objects that were previously not possible or only possible at great expense. For example, in production or packaging machines all dispensed products or items can be provided with an individualised seal or an individual digital signature, which can be tied around the product, for example as an individualised band. Such a band can have a unique and unambiguous code, for example a bar or QR code, which can be read and tracked again and again during the lifetime of the product. This allows products to be tracked and product lifecycle data to be determined, which can be used for further product improvement.

It is preferred in the sense of the invention that the work process comprises at least one process step. In the sense of the invention, this preferably means that the work process may comprise one or more process steps. Preferably, at least one state of the object changes during the execution of the work process, i.e. one or more states of the object can be changed. It may be preferable in the sense of the invention that each state of the object is changed by a separate process step. Alternatively, it may be preferred that several process steps are required to change a state of the object or that several object states can be changed with one process step.

The term "state of an object" in the sense of the invention preferably describes the state which an object may have with respect to a property. For example, if the object is formed by an envelope, the envelope may be printed or unprinted, franked or unfranked, open or closed. These object states are referred to as binary states or binary properties of the object in the sense of the invention, because they can be present in two different forms. The binary states preferably represent disjoint subsets of the state space, whereby the state space is preferably formed by two disjoint subsets and the object can in each case be present in a state which is assigned to either a first or a second subset of the state space. The transfer of the object from a first to a second state is preferably executed by means of the work station of the proposed system, wherein the work station, by executing a process step, causes this transfer from a first to a second binary state.

However, it may also be preferred in the sense of the invention that the object states are continuous states, whereby the states preferably merge smoothly into one another and do not form disjoint subsets of the state space.

For example, if the object is formed by an envelope, the work process may involve franking and sealing the envelope. In this case, the work process consists of two process steps—franking and sealing—and with regard to both properties, which are changed with each process step, binary object states are present, namely franked and unfranked, as well as open and closed.

It may also be preferred in the sense of the invention that the execution of a process step on one object—for example the envelope—changes the state of another object. If, for example, the franking of the envelope is carried out by a franking machine and the envelope is thereby transferred from a first state (unfranked) to a second state (franked), this change of state can simultaneously reduce a numerical value stored in the franking machine.

For example, the franking machine may store a credit value that corresponds to an amount of money that a user has used to top up a franking machine in order to frank his daily outgoing mail. If an envelope is now being franked, a numerical value can be assigned to this franking process, depending on which postal product was selected for franking the envelope. This could be, for example, without limitation a postage amount for a standard letter, a maxi letter or a registered letter.

Triggered by the franking process, the credit value stored in the franking machine is reduced by the numerical value that corresponds to or is assigned to the postal product. In the sense of the invention, the reduction of the credit value preferably corresponds to the change of a state of a non-physical object. In this case, a state within the franking machine, which in this example preferably represents a work station for executing the work process, is changed, namely from a first, original credit value to a second credit value reduced by the franking process. In other words, the franking process changes the status of two objects, namely the status of the envelope and the status of the credit value, so that in this case two status changes result from one process step.

In a preferred embodiment of the invention, the auditor device is adapted to receive an input information and to adapt a process step of the work process depending on the input information.

An "input information" preferably refers to information that the system receives from an external source, e.g. an external server, and that relates to the object and/or a work process to be performed on the object.

For example, the input information can be a priority information for an object or a group of objects. In relation to the above example of a passport production, the processing of a specific object (e.g. a passport of specific person) can be set to a higher priority using the input information.

Based on the input information, the auditor device can provide for a preferred adjustment of one or more process steps in relation to the object. For example, it may be preferable to change the order in which passports are produced and assign a front processing position to the passport of the person concerned.

It may also be preferable that although the sequence of process steps for the production of passports is not changed, a process step intended for further processing is adapted to ensure higher prioritization for subsequent process steps. For example, depending on the prioritization, it may be provided that certain objects (e.g. the passports of a certain person) are sorted into a (separate) priority mailbox, which guarantees a particularly speedy delivery.

The proposed form of execution allows in a particularly simple and robust manner the provision of premium services and/or premium products, which can be remunerated accordingly. With minor adjustments, the system can thus guarantee preferential processing of, for example, a passport.

The input information can also be used to change the state of the object. With regard to the example of printing or franking of envelopes, for example, the input information may include an adaptation and/or addition to the imprint. Thus, by means of the input information for certain objects (e.g. for envelopes from or for certain customers) an individualized imprint (company logo, greeting etc.) can be defined and guaranteed. Seasonal printing can also be applied at short notice for all objects such as envelopes for example.

By providing external input information and the described processing by means of the auditor device, it is advantageously possible to react flexibly to changes and to adapt the work processes in a secure and robust manner.

The external source may preferably be an external server, an external data processing device or another input device, which is suited and adapted to forward input information to the system.

The individualized adaptation of the process steps for selected objects can preferably be accomplished by means of identification elements for the respective objects.

In a preferred embodiment of the invention, the input information comprises information for adapting a process step for an object in dependence on an identification element of the object.

The assignment of an identification element to an object can preferably be accomplished already during the production of the unprocessed raw or initial object, as well as during the execution of process steps, e.g. by a work station or its cryptographic security device, or by the auditor device with the help of the work station. For example, it is possible that a physical memory connected to the object already contains an unchangeable basic identification, which is supplemented by further process steps. The identification element is preferably already present in the auditor device, for example in a memory set up for this purpose, and/or is preferably supplied to it via a trustworthy medium and/or in a cryptographically secure manner.

It may be preferred in the sense of the invention that the identification element is physically assigned to the object. Preferably, such an assignment is also referred to as a physical link between object and identification element. A physical assignment can consist, for example, of a memory or storage device being permanently connected to the object.

Such a memory can be formed by an OTP, for example. The term "OTP" is preferably understood in the sense of the invention as "one time programmable". The memory, which is preferably formed by an OTP, therefore preferably represents an electronic component that inscribed only once. For this purpose, the OTP preferably comprises a non-volatile memory, whereby the physical association between object and identification element can preferably be realised by the object comprising the OTP memory and by having these two objects firmly connected to each other.

Preferably, the memory is readable by the auditor device, so that the auditor can assign the recording information to the ID. It may also be preferred in the sense of the invention that the identification element is logically assigned to the object. A logical assignment can, for example, be formed by an ID that is assigned to the object. It is also preferable in the sense of the invention to speak of a logical connection between object and identification element.

An ID or an ID value is preferably capable of distinguishing between objects that initially appear identical or similar, for example by assigning a combination of numbers or an alphanumeric code, such as a file number, to the objects, which differ from each other even when the objects appear identical or similar, thereby significantly reducing the risk of confusion between objects.

A logical link is preferably made by the system, especially the auditor equipment and/or a work station, especially in connection with a connected and/or integrated storage unit. It may be preferred that printing a code containing an identification element also includes a process step that changes the state of an object. For example, a code printed on an object, e.g. in the form of a barcode and/or franking code, may change the state of an object, in particular its value, and at the same time include an identification element in the printed code.

The proposed system shall include at least one work station, one acquisition device, one control device and one auditor device. The work station, acquisition device, control device and auditor device are referred to as system components in the sense of the invention. The term "at least" means, preferably in the sense of the invention, that the system comprises, for example, at least one work station, but it may also be equally preferred that the system comprises two or three work stations. This applies analogously to all system components. It is also possible that the system includes other components in addition to the system components mentioned. It may be preferred in the sense of the invention that the system components are located together in one location. However, it may also be preferable for individual system components or groups of system components to be located or set up in different locations.

The components of the system are adapted in particular for data processing, wherein the components of the system comprise means or are adapted to carry out the described (preferably computer-implemented) process steps.

The invention thus preferably relates to a system for executing a work process on an object, wherein the work process comprises at least one process step and wherein at least one state of the object is changed at least temporarily by the work process, wherein the system comprises at least the following components:
- a work station adapted to execute the at least one process step of the work process,
- an acquisition device adapted to detect at least one status parameter and/or acquisition information of the work station and/or object, wherein each work station is assigned an acquisition device,
- a control device adapted to control the work stations upon execution of a process step of the work process, and
- an auditor device, wherein the control device, is adapted to interrogate configuration information of the acquisition device at a time point before a start of the work process and the auditor device is adapted to receive and verify the configuration information and to generate auditing information in dependence on a result of the verification of the configuration information and to send the auditing information to the control device, and the control device is adapted for processing the auditing information and starting or not starting the work process in dependence on the auditing information.

The work station is preferably adapted to perform at least one process step of the work process. The working method, which is preferably also referred to as a work process in the sense of the invention, preferably comprises one or more process steps, whereby the process steps can be carried out with one or more work stations of the proposed system. A work station can be, for example, a franking machine, wherein a franking machine preferably comprises a main board, a printing system for issuing or printing letters, as well as a display and mechanical devices for conveying envelopes or label strips. Various software applications can be installed and operated on the mainboard of the franking machine. It is preferred in the sense of the invention that corresponding postage values or postage codes are printed directly on an envelope or a label strip. The printing of a postage code on an envelope or a label strip is preferably referred to in the sense of the invention as "creation of an imprint", whereby the creation of the imprint in the sense of this invention preferably corresponds to a change in the state of an envelope, i.e. an object. It is preferred in the sense of the invention that the imprint is generated with the aid of a cryptographically operating security device, which is preferably part of the franking machine, which may be associated with the auditor device of the proposed system, for example.

The acquisition device is preferably adapted to detect at least one operating parameter of the work station and/or one status parameter of the object, whereby each work station is assigned an acquisition device. For example, if the proposed system comprises two work stations, the system preferably also comprises two acquisition devices, one work station and one acquisition device being associated with each other. The operating parameter describes, for example, whether a work station is ready for operation or not. For example, if a work station is formed by a printer, the status parameter may indicate that the printer is operational because there is enough paper and ink to complete an average print job. However, it is also possible that there is too little paper and/or ink in the printer, so that the printer is not ready and able to perform the desired function, such as printing a defined number of envelopes. The two different operating states of the printer—"operational" and "not operational"— would then be represented or reproduced by different operating parameters.

It may also be preferred in the sense of the invention that the acquisition device acquires at least one status parameter of the object. For example, this could be the status of an envelope that is to be printed with the printer as a work station. For example, the acquisition device can be adapted to determine whether the envelope is "correctly" loaded in the printer feeder so that printing is possible at all. This is not the case, for example, if the envelope is loaded in the printer with the "wrong" side not to be printed on, facing up. It is preferred in the sense of the invention that the proposed system for performing various functions includes sensors which determine the various information required to perform the work process and transmit these to the corresponding processing units. The sensors may include without limitation photoelectric sensors, cameras, thermal sensors, optical sensors, electrical sensors, magnetic sensors and/or acoustic sensors.

The control device is preferably adapted to control the work station while performing a process step of the work process. In particular, the control device controls at least one work station when executing at least one process step of the work process. It may also be preferred in the sense of the invention that the control device controls more than one work station when performing more than one process step. The control device is preferably adapted to request configuration information of the acquisition device at least at a time point before the start of the work process. The configuration information comprises preferably the operating parameters and/or status parameter that the acquisition device obtains from the work stations of the proposed system. In other words, the configuration information preferably represents information that maps and/or describes the state of the system components. The totality of the parameters used to describe the state of the system components thus preferably constitute the configuration information requested by the control device, the acquisition device being the information generator which collects the corresponding data from the system components, in particular the work stations performing the process steps of the work process. In this case the control device is the information recipient.

In addition, the proposed system shall include an auditor device, preferably adapted to receive and verify the configuration information collected by the acquisition device. The procedural steps of the proposed auditing method described herein are preferably referred to as "reception" or "verification of configuration information by the auditor device". The verification is preferably carried out by comparing IDs or ID values assigned to the system components, whereby in particular the actual IDs of the system components are compared with the target IDs stored in the system, preferably in the control device or in the auditor. During the verification it is therefore preferably determined whether the actual IDs, which describe the actual status of a system component, and the target IDs, which are preferably stored in the system for each system component, match.

The verification of the configuration information by the auditor device may also include a verification of the configuration information. In other words, the auditor device is adapted to verify the authenticity of system components or parts of the proposed system. Preferably, the auditor device is adapted to verify the configuration information.

For example, if the system includes a coffee machine, the auditor device can be used to determine whether or not the coffee pads from the coffee machine manufacturer are used. These coffee pads, which are produced by the manufacturer of the coffee machine, are called "genuine" coffee pads in the sense of the invention. In the event of a negative assessment, i.e. if coffee pads from another, possibly cheaper competitor are used, the dispensing of a coffee beverage can be refused, for example. Similar verification processes are conceivable for printers or many technical devices where components or consumables need to be refilled or replaced regularly, which can make a not inconsiderable contribution to the financial success of a product.

The proposed system or method can thus also help to verify compliance with service level agreements or maintenance contracts. For example, if an entity A has a maintenance contract with a service provider B for the maintenance of a group of items of technical equipment, the maintenance contract may include an agreement on an operating period per machine, after which service provider B automatically executes the maintenance. If the equipment is regularly audited by Company A through a proposed system or method, the risk of fraud to extend maintenance intervals is significantly reduced because Company A can then no longer manipulate the internal clock in its equipment to claim to Service Provider B that the number of hours of operation requiring maintenance has not yet accumulated. Thus, the proposed system and procedure will help to significantly reduce the risk of tampering with mechanical or electromechanical devices which are themselves easy to manipulate.

As a result of the verification of the configuration information by the auditor setup, the auditing information is obtained, which is referred to in the sense of the invention as the derivation of the auditing information from the configuration information. In other words, the auditor of the proposed system compares the configuration information with target data, and the IT result of this comparison or verification is preferably referred to as "auditing information". In other words, it is preferred in the sense of the invention that the auditing information can be derived from the configuration information or that the auditing information is derivable from the configuration information. For example, the audit result may be positive, if the configuration data of all system components match the corresponding target values, while a negative audit result is obtained if the configuration data do not match the target values, where, for example, a mismatch is sufficient to obtain an overall negative audit result. The auditing information is derived from the configuration information, in particular depending on the result of the comparison of actual and target data or depending on the result of the verification of the configuration information. This process is preferably referred to in the sense of the invention as "generation of an auditing information by the auditor device depending on a result of the verification of the configuration information".

Preferably, the auditor device is adapted to forward or send the auditing information to the control device of the proposed system. This process is preferably referred to in the context of the proposed auditing method as "sending the auditing information from the auditing device to the control device". To this end, the auditor shall preferably include the appropriate means of communication. In this context, the auditor represents the information provider and the control unit the information receiver. Preferably, the control device is adapted to process the auditing information and, depending on the auditing information, to start or cause the work process to be started, which is to be executed with the proposed system. These operations are preferably referred to in the context of the proposed auditing method as "processing of the auditing information by the control device" and "starting of the work process by the control device depending on the auditing information". If the audit result is positive, for example, a start signal for the work process can be generated in the control device and sent to the work stations, where the process steps are performed. If the audit result is negative, the generation and transmission of a corresponding start signal is omitted. The described method can be repeated at a later time. For example, if the audit result is negative, and if a positive audit result is later on obtained, the work process may executed.

It is preferable in the sense of the invention that the proposed system is adapted to perform a watchdog function by regularly performing the proposed auditing method and/or upon initiation by an event. The event leading to the initiation or execution of the audit method may be for example a change in system configuration. It may be preferable, for example, that the proposed auditing method includes a watchdog function by executing all or part of the steps a) to g) below on a regular basis and/or by initiating their implementation through an event to be defined. In particular, an audit cycle comprising, for example, the procedural steps a) to g) mentioned below may be carried out regularly or initiated when a previously defined event occurs. It may also be preferable, in the sense of the invention, to store in the system intervals at which an auditing method is carried out. For example, if the system is formed by a network of technical equipment, it is possible to define in the system, for example in the control device or in the auditor, that an auditing method is carried out at intervals of minutes, hours, days, weeks, months or years, depending on the need, maintenance requirements and/or the duration and frequency of use of the technical equipment.

For example, it is preferable in the sense of the invention that the proposed method is carried out before the start of a work process. For example, it can be carried out during commissioning of a newly assembled system consisting of different system components or during an operating pause to determine the operating and/or status parameters of the system components. In this context, it is particularly preferred if the acquisition device not only determines binary states of the system components, such as "operational" and "not operational", but can also determine and transmit continuous intermediate states, such as filling levels or degrees of wear and tear. These can preferably be expressed as a percentage (%) and can take values between 0 and 100%, with values such as 0.3%; 12.5%; 27.85% and all other possible values. It may also be preferable in the sense of the invention to combine percentage ranges of values and assign them to a common operating and/or status parameter. For example, when describing the fill level of an ink cartridge in a printing device, all levels below 15% can be interpreted as "not operational", while levels above 15% may be interpreted as "operational".

It is preferred in the sense of the invention that the described method is referred to as an auditing method. It is described in detail below as the second aspect of the invention besides the proposed system. In this aspect, the invention relates to a method for executing a work process on an object, wherein the work process is carried out by a work station and comprises at least one process step and wherein the work process at least temporarily changes at least one state of the object. The proposed method comprises the following steps:

a) interrogation of configuration information of an acquisition device by a control device at a time point before starting of the work process, wherein the acquisition device is assigned to the work station and is adapted to acquire at least one acquisition information and/or one status parameter of the work station and/or the object, b) receipt of the configuration information by an auditor device, c) verification of the configuration information by the auditor device, d) creation of auditing information by the auditor device as a function of a result of the verification of the configuration information, e) sending of the auditing information by the auditor device to the control device, f) processing of the auditing information by the control device, and g) starting of the work process by the control device depending on the auditing information.

The definitions, beneficial effects and surprising advantages of the invention described in relation to the proposed system apply by analogy to the proposed method, and vice versa.

The dependent claims and the description provide further advantages, features and details of the invention. The features mentioned therein maybe be individually or in any combination of significance for the invention. Thereby, the disclosure of the individual aspects of the invention can always be referred to reciprocally.

It is preferred in the sense of the invention that the system is adapted to perform a dead man's switch in which the performance of the work process is stopped, if an expected event does not occur or an unexpected event occurs. Deviating therefrom, the object can also be invalidated in a subsequent process step, i.e. a through a deliberate erroneous processing a possible validity of the previous process step and thus a valid intermediate version of the object can be prevented. Preferably, the proposed auditing method may include a dead man's switch or invalidation function that can stop or selectively modify the execution of the work process when an expected event does not occur or when an unexpected event occurs.

It may therefore be preferable for the procedure to include an invalidity function that specifically modifies the performance of the work process if an expected event does not occur or an unexpected event occurs.

It is preferable in the sense of the invention that the system includes means by which the proposed system is adapted to detect unexpected changes in the system.

Preferably, the method is capable of detecting unexpected changes in a system comprising a work station, an acquisition device, a control device and an auditor device, the system comprising means by which the system is adapted to detect unexpected changes in the system. In particular, these means may be sensors that are adapted to detect unexpected changes in the system components, in the parts of the system components or in the object that is to be altered by the work process. The sensors can preferably be selected without limitation from a group comprising light barriers, cameras, thermal sensors, optical sensors, electrical sensors, magnetic sensors and/or acoustic sensors.

The invention is described in more detail in the following figures. It is noted that the drawings are merely of exemplary nature to clarify the invention and not intended to be limiting.

Figure 2:
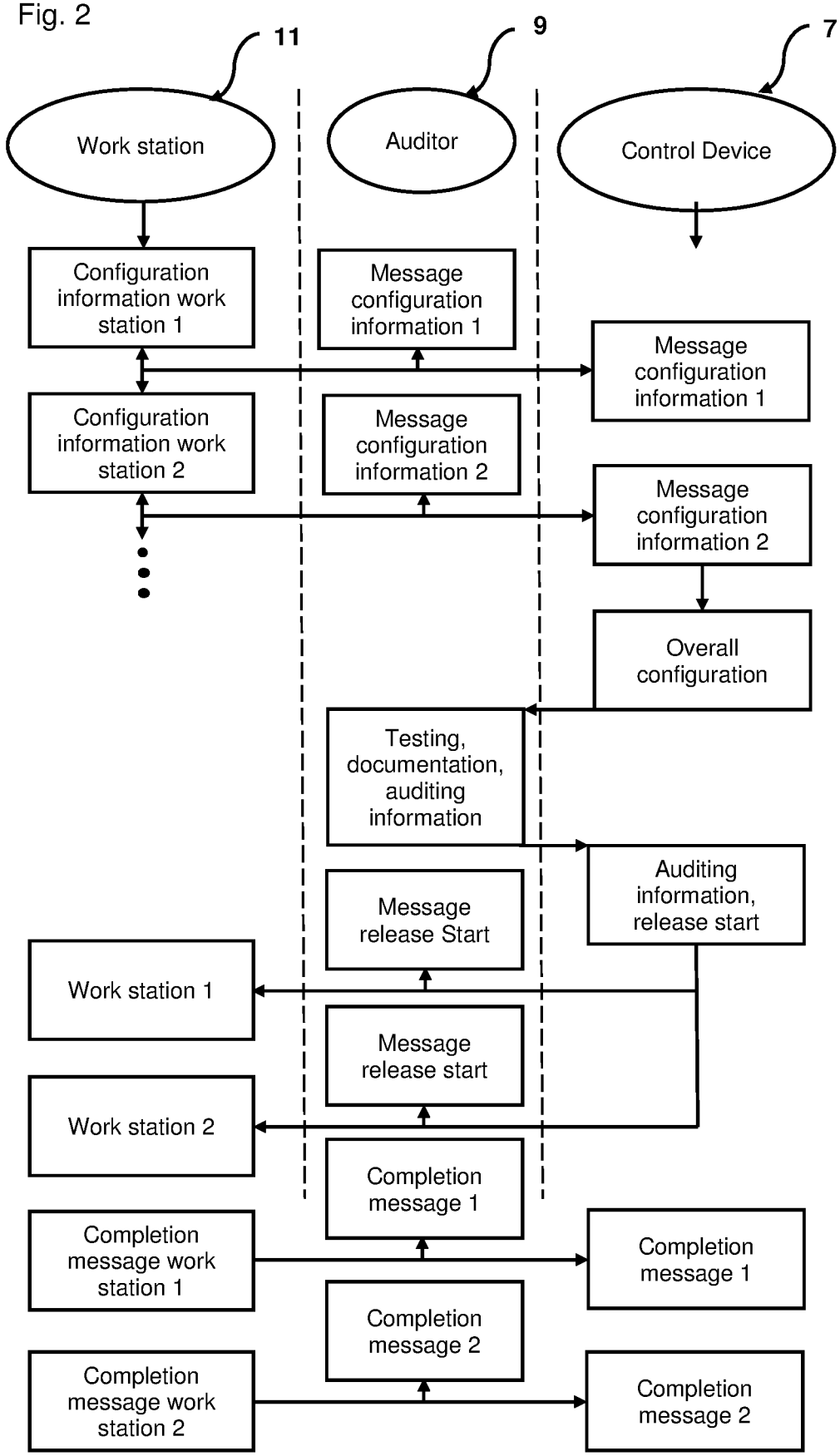
FIG. 2 illustrates a flow chart of a process embodiment of the present invention.

FIGS. 1 and 2: Flow Charts for illustrating the invention

FIG. 1 depicts a system 1, wherein a work process is executed on object 3 by work stations 11 and the state of the object is changed. The acquisition information, which represents a status and/or an operating parameter, is acquired by the acquisition device 5. The control device 7 can now request configuration information from the acquisition device 5 before starting another work process. Auditor device 9 receives the configuration information and verifies said configuration information. Depending on the result of the verification of the configuration information, the auditor device 9 creates an auditing information and sends it to the control unit. Depending on the auditing information, the control device 7 starts a work process or not. The configuration information preferably comprises the operating parameters and/or status data which the acquisition device 5 derives from the work stations 11 and may preferably also comprise an identification element of the object 3. The processes and/or configuration information can preferably also be stored in a memory 15 in the network, e.g. as part of the Internet 17. HSM 13 is preferably used in the components to increase safety. Preferably, the auditor device 9 is also adapted to receive an input information 25 from an external source, for example an external server 15, and to adjust a process step of the work process depending on the input information 25.

FIG. 2 presents a typical flow of a process. Auditor 9 requests information from work station 11 and verifies the configuration information, which is preferably transmitted to the control device 7. The auditor 9 can thus initiate the release of work processes. Auditor 9 can also carry out testing, documentation and auditing.

LIST OF REFERENCE SIGNS 1 system
3 object
5 acquisition device
7 control device
9 auditor or auditor device
11 work station
13 HSM
15 memory
17 internet
19 identification element
25 input information
5 acquisition device
7 control device
9 auditor or auditor device
11 work station
13 HSM
15 memory
17 internet
19 identification element|MB$_{[1]}$
25 input information

What is claimed is:

1. A system (1) for executing a work process on an object (3), wherein the work process comprises at least one process step and wherein at least one state of the object (3) is changed at least temporarily by the work process, wherein the system (1) comprises at least the following components:
a work station (11) for executing the at least one process step of the work process,
an acquisition device (5) for acquiring at least one status parameter and/or acquisition information of the work station (11) and/or of the object (3), each work station (11) being assigned an acquisition device (5),
a control device (7) for controlling the work station (11) while executing a process step of the work process, and
an auditor device (9)
characterized in that
the control device (7) interrogates configuration information of the acquisition device (5) at a time point before a start of said work process, and the auditor device (9) receives and verifies said configuration information and generates auditing information depending on a result of the verification of said configuration information and sends said auditing information to the control device (7), and the control device (7) processes said auditing information and depending on said auditing information starts said work process or not.

2. The system (1) according to claim 1,
characterized in that
the configuration information is at least an ID, an acquisition information and/or a status information of said acquisition device.

3. The system (1) according to claim 1,
characterized in that
the auditing information can be derived from the configuration information.

4. The system (1) according to claim 1
characterized in that
the auditor device is safety device of said work station.

5. The system (1) according to claim 1
characterized in that
the auditor device is adapted to verify the configuration information.

6. The system (1) according to claim 1
characterized in that
the auditor device is adapted to secure the auditing information by cryptographic means.

7. The system (1) according to claim 1
characterized in that
the auditor device is adapted to receive input information and to adjust a process step of the work process depending on the input information.

8. The system (1) according to claim 1
characterized in that
the system is adapted to perform a watchdog function by performing an auditing method at regular intervals and/or upon initiation by an event.

9. The system (1) according to claim 1
characterized in that
the system (1) is adapted to perform a dead man's switch in which the execution of the work process is stopped if an expected event does not occur.

10. The system (1) according to claim 1
characterized in that
the system (1) comprises means by which the system (1) is adapted to detect unexpected changes of the system (1).

11. A method for executing a work process on an object (3), wherein the work process is executed by a work station (11) and comprises at least one process step and wherein at least one state of the object (3) is changed at least temporarily by the work process, the method comprising:
- a) interrogation of configuration information of an acquisition device (5) by a control device (7) at a time point before starting the work process,
- wherein the acquisition device (5) is assigned to the work station (11) and is adapted to detect at least one status parameter and/or acquisition information of the work station (11) and/or the object (3),
- b) receipt of the configuration information by an auditor device (9),
- c) verification of the configuration information by the auditor device (9),
- d) creation of an auditing information by the auditor device (9) depending on a result of the verification of the configuration information,
- e) sending of the auditing information by the auditor device (9) to the control device (7),
- f) processing of the auditing information by the control device (7) and
- g) starting of the work process by the control device (7) in dependence on the auditing information.

12. The method according to claim 11
characterized in that
the method comprises a watchdog function in that the method steps a) to g) are executed in whole or in part regularly and/or their execution is initiated by an event.

13. The method according to claim 12
characterized in that
the method comprises a dead man's switch by which the execution of the work process is stopped if an expected event does not occur or an unexpected event occurs.

14. The method according to claim 11,
characterized in that
the method comprises an invalidity function by which the performance of the work process is deliberately altered when an expected event does not occur, or an unexpected event occurs.

15. The method according to claim 11,
characterized in that
unexpected changes of a system (1) comprising a work station (11), an acquisition device (5), a control device (7) and an auditor device (9) can be detected with the method.

* * * * *